US009152698B1

(12) United States Patent
Dhamdhere et al.

(10) Patent No.: US 9,152,698 B1

(45) Date of Patent: Oct. 6, 2015

(54) SUBSTITUTE TERM IDENTIFICATION BASED ON OVER-REPRESENTED TERMS IDENTIFICATION

(75) Inventors: Kedar Dhamdhere, Sunnyvale, CA (US); John Ogden Lamping, Los Altos, CA (US); Paul A. Tucker, Los Altos, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/342,604

(22) Filed: Jan. 3, 2012

(51) Int. Cl.
*G06F 17/30* (2006.01)
*G06F 7/00* (2006.01)

(52) U.S. Cl.
CPC .................................. *G06F 17/3064* (2013.01)

(58) Field of Classification Search
USPC ................................ 707/730; 704/1, 10, 260
See application file for complete search history.

(56) References Cited

U.S. PATENT DOCUMENTS 4,164,025 A 8/1979 Dubnowski et al.
4,823,306 A 4/1989 Barbic et al.
5,724,571 A 3/1998 Woods
5,826,261 A 10/1998 Spencer
5,926,812 A 7/1999 Hilsenrath et al.
5,960,383 A 9/1999 Fleischer
5,987,457 A 11/1999 Ballard
6,006,222 A 12/1999 Culliss
6,012,053 A 1/2000 Pant et al.
6,014,665 A 1/2000 Culliss
6,029,195 A 2/2000 Herz
6,035,294 A 3/2000 Fish
6,078,916 A 6/2000 Culliss
6,169,986 B1 1/2001 Bowman et al.
6,182,067 B1 1/2001 Presnell et al.
6,272,507 B1 8/2001 Pirolli et al.
6,285,999 B1 9/2001 Page
6,289,353 B1 9/2001 Hazlehurst et al.
6,311,214 B1 10/2001 Rhoads
6,314,419 B1 11/2001 Faisal
6,360,215 B1 3/2002 Judd et al.
6,405,175 B1 6/2002 Ng
6,421,675 B1 7/2002 Ryan et al.

(Continued)

FOREIGN PATENT DOCUMENTS

EP 1505520 5/2006
WO 2006096842 9/2006

OTHER PUBLICATIONS

"The Direct Hit Popularity Engine Technology, A White Paper," [online]; Retrieved from the Internet URL: http://www.uni-koblenz.de/FB4/Institues/ICV/AGKrause/Teachings/SS07/DirectHit.pdf, Apr. 2, 2009, 5 pages.

(Continued)

*Primary Examiner* — Shyue Jiunn Hwa
(74) *Attorney, Agent, or Firm* — Fish & Richardson P.C.

(57) ABSTRACT

Methods, systems, and apparatus, including computer programs encoded on a computer storage medium, for identifying substitute terms. According to one implementation, a method includes receiving an original query that includes one or more query terms; obtaining initial search results in response to the original query; identifying an over-represented term in text associated with a subset of the initial search results; determining that the over-represented term is associated with a particular query term; and in response to determining the over-represented term is associated with the particular query term, revising the original query to include the over-represented term.

36 Claims, 4 Drawing Sheets

(56) References Cited

U.S. PATENT DOCUMENTS 6,473,752 B1 10/2002 Fleming
6,480,837 B1 11/2002 Dutta
6,513,036 B2 1/2003 Fruensgaard et al.
6,636,848 B1 10/2003 Aridor et al.
6,732,088 B1 5/2004 Glance
6,772,150 B1 8/2004 Whitman et al.
7,062,561 B1 6/2006 Reisman
7,085,820 B1 8/2006 Nickerson et al.
7,409,383 B1 8/2008 Tong et al.
7,480,652 B2 1/2009 Wen et al.
7,562,069 B1 7/2009 Chowdhury et al.
7,565,345 B2 7/2009 Bailey et al.
7,617,200 B2 11/2009 Budzik et al.
7,620,628 B2 11/2009 Kapur et al.
7,636,714 B1 12/2009 Lamping et al.
7,716,216 B1 5/2010 Harik et al.
7,788,261 B2 8/2010 Hoeber et al.
7,860,870 B2 12/2010 Sadagopan et al.
7,925,498 B1 4/2011 Baker et al.
7,966,341 B2 6/2011 Maghoul et al.
8,001,118 B2 8/2011 Dean et al.
8,037,086 B1 10/2011 Upstill et al.
8,041,730 B1 10/2011 Upstill et al.
8,065,316 B1 11/2011 Baker et al.
8,103,669 B2 1/2012 Castellani et al.
8,250,066 B2 8/2012 Miedema
8,316,007 B2 11/2012 Liao
8,321,201 B1 * 11/2012 Baker et al. ........................ 704/9
8,346,757 B1 1/2013 Lamping et al.
8,352,469 B2 1/2013 Rose
8,392,443 B1 3/2013 Allon et al.
8,401,841 B2 3/2013 Roitblat et al.
8,429,184 B2 4/2013 Ismalon
8,463,782 B1 6/2013 Upstill et al.
8,498,974 B1 7/2013 Kim et al.
8,504,562 B1 8/2013 Ikeda et al.
8,538,984 B1 9/2013 Mahabal et al.
8,600,973 B1 12/2013 Popovici et al.
8,620,915 B1 12/2013 Brukman et al.
8,631,019 B1 1/2014 Shaw et al.
8,645,390 B1 2/2014 Oztekin et al.
8,762,363 B1 6/2014 Koo et al.
2002/0032735 A1 3/2002 Burnstein et al.
2002/0078045 A1 6/2002 Dutta
2002/0103798 A1 8/2002 Abrol et al.
2002/0133483 A1 9/2002 Klenk et al.
2002/0156816 A1 10/2002 Kantrowitz et al.
2003/0123443 A1 7/2003 Anwar
2003/0167266 A1 9/2003 Saldanha et al.
2004/0236730 A1 * 11/2004 Frank ................................ 707/3
2005/0076003 A1 4/2005 DuBose et al.
2005/0125392 A1 6/2005 Curtis et al.
2006/0167842 A1 7/2006 Watson
2006/0253427 A1 11/2006 Wu et al.
2007/0005590 A1 1/2007 Thrasher
2007/0011154 A1 1/2007 Musgrove et al.
2007/0094234 A1 4/2007 Wen et al.
2007/0214131 A1 9/2007 Cucerzan et al.
2008/0040325 A1 2/2008 Sachs et al.
2008/0091670 A1 4/2008 Ismalon
2008/0097891 A1 4/2008 Park
2008/0114721 A1 * 5/2008 Jones et al. ....................... 707/2
2008/0114751 A1 * 5/2008 Cramer et al. .................... 707/5
2008/0140641 A1 6/2008 Wang
2008/0140643 A1 * 6/2008 Ismalon ............................ 707/5
2008/0147638 A1 6/2008 Hoeber et al.
2008/0228754 A1 9/2008 Frank et al.
2008/0235187 A1 * 9/2008 Gade et al. ........................ 707/3
2008/0270138 A1 * 10/2008 Knight et al. ................. 704/260
2009/0006359 A1 1/2009 Liao
2009/0043749 A1 2/2009 Garg et al.
2009/0063431 A1 * 3/2009 Erol et al. ......................... 707/3
2009/0106221 A1 4/2009 Meyerzon et al.
2009/0119261 A1 5/2009 Ismalon
2009/0182734 A1 7/2009 Wen et al.
2009/0198672 A1 * 8/2009 Jones et al. ....................... 707/5
2009/0313286 A1 12/2009 Mishra et al.
2010/0010968 A1 1/2010 Redlich et al.
2010/0125575 A1 5/2010 Zaragoza
2010/0138402 A1 6/2010 Burroughs et al.
2010/0257164 A1 10/2010 Halverson et al.
2010/0306229 A1 12/2010 Timm et al.
2011/0078049 A1 3/2011 Rehman et al.
2011/0179023 A1 7/2011 Dean et al.
2011/0258149 A1 10/2011 Kanungo et al.
2012/0095951 A1 4/2012 Ray
2012/0158685 A1 6/2012 White et al.
2012/0158765 A1 6/2012 Kumar et al.
2012/0290637 A1 11/2012 Perantatos et al.
2012/0303651 A1 11/2012 Tao
2012/0317088 A1 12/2012 Pantel et al.
2012/0323677 A1 12/2012 Bottou et al.
2013/0041921 A1 * 2/2013 Cooper et al. ................ 707/780
2013/0086509 A1 4/2013 Satyanarayana et al.
2013/0246383 A1 9/2013 White et al.

OTHER PUBLICATIONS

Office Action issued in U.S. Appl. No. 13/661,734 on Apr. 14, 2014, 6 pages.

Notice of Allowance issued in U.S. Appl. No. 13/532,326 on Feb. 25, 2014, 5 pages.

Office Action issued in U.S. Appl. No. 13/532,326 on Oct. 24, 2013, 13 pages.

Office Action issued in U.S. Appl. No. 13/481,166 on Jun. 19, 2014, 7 pages.

Office Action issued in U.S. Appl. No. 13/651,688 on Apr. 7, 2014, 32 pages.

Office Action issued in U.S. Appl. No. 13/651,688 on Jan. 17, 2014, 30 pages.

Office Action issued in U.S. Appl. No. 13/443,405 on Jun. 19, 2014, 10 pages.

Office Action issued in U.S. Appl. No. 13/302,935 on Jul. 11, 2014, 16 pages.

Notice of Allowance received in U.S. Appl. No. 13/342,560 on Jul. 24, 2013, 22 pages.

Office Action issued in U.S. Appl. No. 13/342,560 on Apr. 18, 2013, 14 pages.

Office Action issued in U.S. Appl. No. 13/342,560 on Nov. 26, 2012, 15 pages.

Office Action issued in U.S. Appl. No. 13/564,882 on Jul. 1, 2014, 8 pages.

Huang et al., "Analyzing and Evaluating Query Reformulation Strategies in Web Search Logs," CIKM'09, Nov. 2-6, 2009, 77-86, 10 pages.

Ananthanarayanan et al., "Rule based synonyms for entity extraction from noisy text", In Proceedings of the second workshop on Analytics for noisy unstructured text data, 31-38, ACM, Jul. 2008.

Efthimiadis, "Interactive Query Expansion: A User-Based Evaluation in a Relevance Feedback Environment," Journal of the American Society for Information Science, 51(11):989-1003, 2000, John Wiley & Sons, Inc.

Office Action issued in U.S. Appl. No. 13/727,968 on Aug. 19, 2014, 12 pages.

* cited by examiner

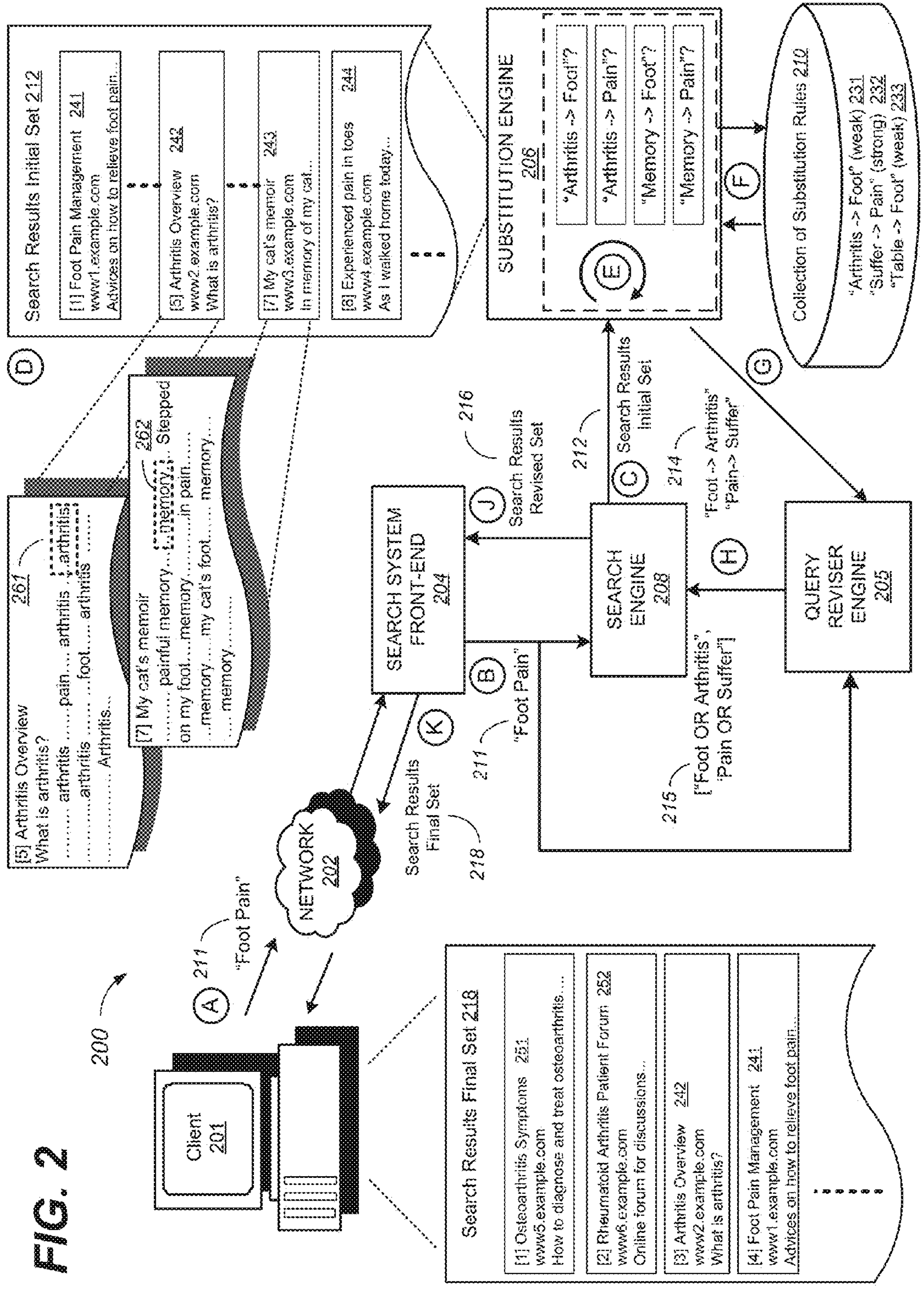
FIG. 2
200
Client 201
A
211
"Foot Pain"
NETWORK 202
Search Results Final Set 218
[1] Osteoarthritis Symptoms 251
www5.example.com
How to diagnose and treat osteoarthritis...
[2] Rheumatoid Arthritis Patient Forum 252
www6.example.com
Online forum for discussions...
[3] Arthritis Overview 242
www2.example.com
What is arthritis?
[4] Foot Pain Management 241
www1.example.com
Advices on how to relieve foot pain...
K
Search Results Final Set
218
SEARCH SYSTEM FRONT-END 204
B
211
"Foot Pain"
J
Search Results Revised Set
216
SEARCH ENGINE 208
C
212
Search Results Initial Set
H
214
"Foot -> Arthritis"
"Pain-> Suffer"
215
["Foot OR Arthritis", "Pain OR Suffer"]
QUERY REVISER ENGINE 205
G
SUBSTITUTION ENGINE 206
E
"Arthritis -> Foot"?
"Arthritis -> Pain"?
"Memory -> Foot"?
"Memory -> Pain"?
F
Collection of Substitution Rules 210
"Arthritis -> Foot" (weak) 231
"Suffer -> Pain" (strong) 232
"Table -> Foot" (weak) 233
D
Search Results Initial Set 212
[1] Foot Pain Management 241
www1.example.com
Advices on how to relieve foot pain...
[5] Arthritis Overview 242
www2.example.com
What is arthritis?
[7] My cat's memoir 243
www3.example.com
In memory of my cat...
[8] Experienced pain in toes 244
www4.example.com
As I walked home today...
[5] Arthritis Overview
What is arthritis?
261
[7] My cat's memoir
262

400

| | Referenced in Substitution Rule? | | Included in Revised Query? | |
|---|---|---|---|---|
| Over-Represented Term | Strong | Weak | Strong | Weak |
| 411 Stop words ("a", "the", etc) | - | - | No | No |
| 412 No | No | No | No | No |
| No | 413 Yes | 414 Yes | Yes | No |
| 415 Yes | No | No | No | No |
| Yes | 416 Yes | 417 Yes | Yes | Yes |

*FIG. 4*

SUBSTITUTE TERM IDENTIFICATION BASED ON OVER-REPRESENTED TERMS IDENTIFICATION

BACKGROUND

This specification generally relates to search engines, and one particular implementation relates to identifying substitute query terms based on search results.

SUMMARY

According to one innovative aspect of the subject matter described in this specification, search results generated using user-provided query terms are evaluated to determine whether the user-provided query terms can be revised to generate other search results that may be more relevant to the user's information need. For example, an over-represented term from the initial search results may be identified as a candidate substitute term to one of the user-provided query terms. If the over-represented term is weakly associated with the query term, e.g., through substitution rules, the over-representation of the term may suggest that a substitution should be made despite the weak association.

According to another innovative aspect of the subject matter described in this specification, a method includes receiving an original query that includes one or more query terms. The method also includes obtaining initial search results in response to the original query, identifying an over-represented term in text associated with a subset of the initial search results, determining that the over-represented term is associated with a particular query term; and in response to determining the over-represented term is associated with the particular query term, revising the original query to include the over-represented term.

Other implementations of this aspect include corresponding systems, apparatus, and computer programs, configured to perform the actions of the methods, encoded on computer storage devices.

These and other implementations can each optionally include one or more of the following features. For instance, the method includes obtaining subsequent search results in response to the revised query, and providing a subset of the subsequent search results; the method includes the initial search results are obtained from an initial corpus of indexed resources and the subsequent search results are obtained from a different corpus of indexed resources; the method includes types of the different corpus of indexed resources including one or more of text, image, video, advertisement, and map; the method includes identifying the over-represented term in text from one or more of titles, snippets, and resources associated with a subset of the initial search results; the method includes the over-represented term is associated with the particular query term by one or more of a weak substitution rule and a low confidence score; the method includes the over-represented term is input of the weak substitution rule; the method includes determining that the over-represented term is associated with a particular query term, and in response to determining the over-represented term is associated with the particular query term, modifying a confidence score of the over-represented term associated with the particular query term; the method includes revising the original query to include the over-represented term by adding the over-represented term and one or more logical operators to the original query; the method includes revising the original query to include the over-represented term by replacing the query term with the over-represented term; the method includes determining that the term's overall rate of occurrence among the initial search results is higher than the term's rate of occurrence in a corpus as a whole; the method includes determining that the term's overall rate of occurrence in a document referenced by the initial search results is higher than the term's rate of occurrence in a corpus as a whole; the method includes determining that the term's frequency-inverse document frequency (tf-idf) weight is above a threshold.

Advantageous implementations may include one or more of the following features. The search system may provide a user with more relevant search results, especially when the search terms involve specialized fields which the user may not be familiar with (e.g., medical conditions). A weak association between a query term and a corresponding candidate substitute term may be identified and applied under a specific context, where the identification is empirically supported by the search results. The search system can store the identified context-specific substitution rules for future application of substitute term identification. The search system developers can better estimate the utility of particular substitutions out of a large set of possible substitutions.

The details of one or more implementations are set forth in the accompanying drawings and the description below. Other potential features and advantages will become apparent from the description, the drawings, and the claims.

BRIEF DESCRIPTION OF THE DRAWINGS

FIG. 2 is a block diagram of an example system that identifies substitute terms based on the existence of over-represented terms in search results.

FIG. 4 shows an example table of how to determine whether to include a term in a revised query.

Like reference numbers and designations in the various drawings indicate like elements.

DETAILED DESCRIPTION

Figure 1:
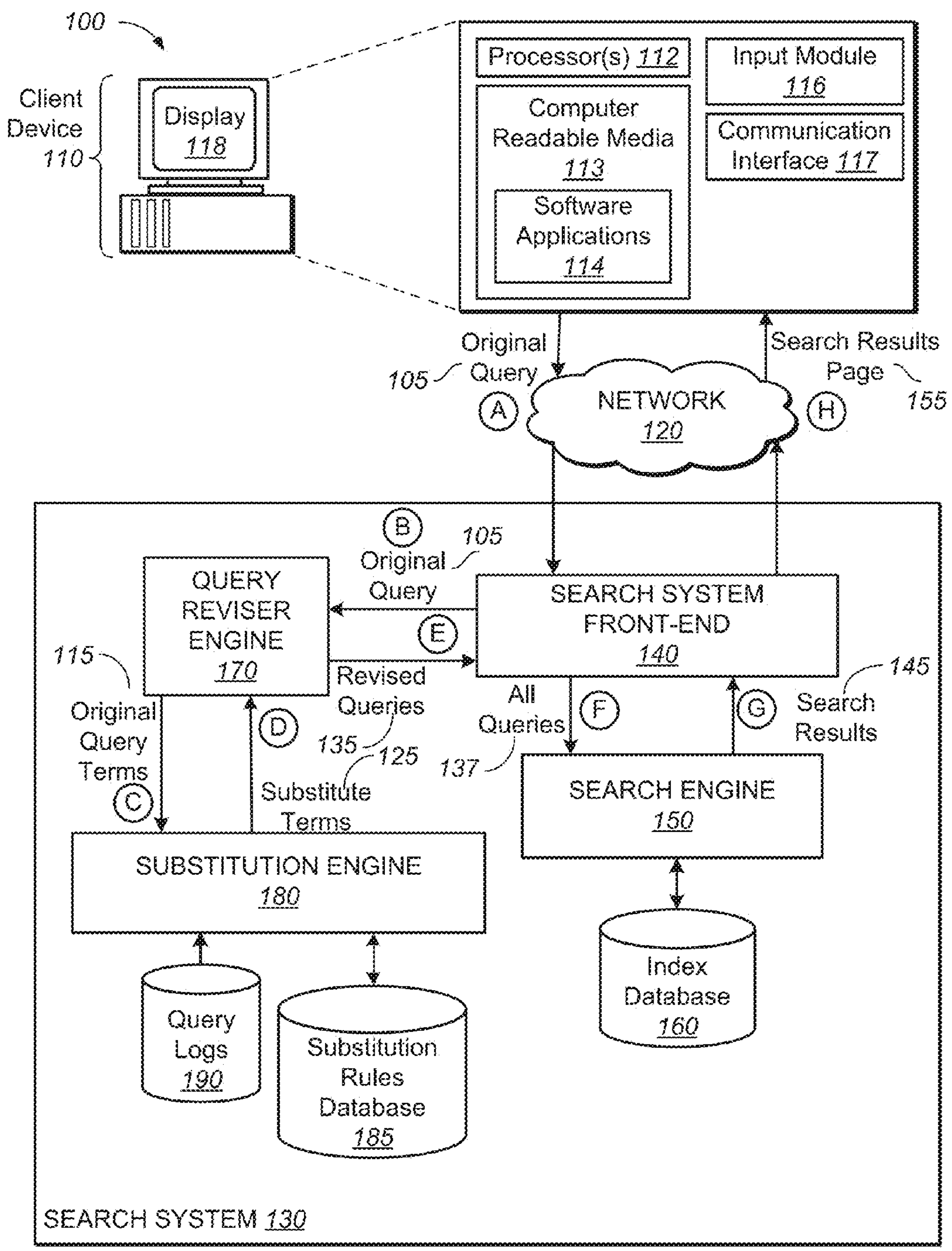
FIG. 1 is a block diagram of an example system that can use substitute terms to generate search results.

FIG. 1 is a diagram of an example system 100 that can use substitute terms to generate search results. In general, the system 100 includes a client device 110 coupled to a search system 130 over a network 120. The search system 130 includes a search engine 150, a query reviser engine 170, and a substitution engine 180. The search system 130 receives a query 105, referred to by this specification as the "original query" or an "initial query," from the client device 110 over the network 120. The search system 130 provides a search results page 155, which presents search results 145 identified as being responsive to the query 105, to the client device 110 over the network 120. Here, a substitute term is a term which can be an alternative term to an original query term in an original query, which in some implementations can be added in disjunction with the corresponding original query term in a revised query. In some other implementations, a substitute term can replace the corresponding original query term in a revised query.

In some implementations, the search results 145 identified by the search system 130 can include one or more search results that are identified as being responsive to queries that are different than the original query 105. The search system 130 can generate or obtain other queries in numerous ways (e.g., by revising the original query 105).

In some implementations, the search system 130 can generate a revised query by adding to the original query 105 additional terms that are substitute terms of one or more terms that occur in the original query 105. The search system 130 may also add logical operators (e.g. "OR") between a substitute term and the corresponding original query term. In other implementations, the search system 130 can generate a revised query by modifying terms that are substitute terms of terms that occur in the original query 105, in place of the terms in the original query 105. The substitution engine 180 can determine the additional terms that are candidate substitute terms for the one or more terms that occur in the original query. The query reviser engine 170 can generate the revised query. The search engine 150 can use the original query 105 and the revised queries to identify and rank search results. The search engine 150 can provide the identified search results 145 to the client device 110 on the search results page 155.

The substitution engine 180 can identify the substitute terms the query reviser engine 170 can use to generate revised queries by evaluating terms included in previously received queries stored in a query logs database 190. For example, given a first term ("cat"), the substitution engine 180 can evaluate terms ("feline" or "banana") that are candidate substitute terms for the original term. In addition, the substitution engine 180 can determine that certain terms are substitute terms of the first term (as in the case of "feline"), and that other terms are not substitute terms of the first term (as in the case of "banana"). The substitution engine 180 can base this determination on rules stored in a substitution rules database 185. For example, a substitution rule can define that "feline" is a substitute term for cat and "banana" is not a substitute term for cat.

The search system 130 can define substitution rules to apply generally, or to apply only when particular conditions, or "query contexts," are satisfied. For example, the query context of a substitution rule can specify one or more other terms that should be present in the query for the substitution rule to apply. Furthermore, query contexts can specify relative locations for the other terms (e.g., to the right or left of a query term under evaluation). In another example, query contexts can specify a general location (e.g., anywhere in the query). For example, a particular substitution rule can specify that the term "pet" is a substitute term for the query term "dog," but only when the query term "dog" is followed by the term "food" in the query. Multiple distinct substitution rules can generate the same substitute term for a given query term. For example, for the query term "dog" in the query "dog food," the term "pet" can be specified as a substitute term for "dog" by both a substitution rule for "dog" in the general context and a substitution rule for "dog" when followed by "food."

The substitution rules can depend on query contexts that define other terms in the original query 105. In other words, a substitution rule need not apply in all situations. For example, when the term "cats" is used as a single-term query, the term "felines" can be considered a substitute term for "cats". The substitution engine 180 can return the term "felines" to the query reviser engine 170 to generate a revised search query. In another example, when the query includes the term "cats" followed by the term "musical," a substitution rule can specify that the term "felines" is not a substitute term for "cats." In some implementations, the substitution rules can be stored in the substitution rules database 185 for use by the substitution engine 180, the query reviser engine 170, or the search engine 150. In some implementations, the term in a substitution rule may not be a single word only. For example, a substitution rule may specify the term "felines" as a substitution term for the compounded terms "shorthair cat."

The queries stored in the query logs database 190 can include previous queries where a user considered the results of the queries desirable. For example, the user can select the provided search results from a query, in effect, validating the search results.

In the illustrative example of FIG. 1 the search system 130 can be implemented as computer programs running on one or more computers in one or more locations that are coupled to each other through a network (e.g., network 120). The search system 130 includes a search system front end 140 (e.g., a "gateway server") that coordinates requests between other parts of the search system 130 and the client device 110. The search system 130 also includes one or more "engines": the search engine 150, a query reviser engine 170, and the substitution engine 180.

As used in this specification, an "engine" (or "software engine") refers to a software implemented input/output system that provides an output that is different from the input. An engine can be an encoded block of functionality, such as a library, a platform, a Software Development Kit ("SDK"), or an object. The network 120 can include, for example, a wireless cellular network, a wireless local area network (WLAN) or Wi-Fi network, a Third Generation (3G) or Fourth Generation (4G) mobile telecommunications network, a wired Ethernet network, a private network such as an intranet, a public network such as the Internet, or any appropriate combination thereof.

The search system front-end 140, the search engine 150, the query reviser engine 170, and the substitution engine 180 can be implemented on any appropriate type of computing device (e.g., servers, mobile phones, tablet computers, notebook computers, music players, e-book readers, laptop or desktop computers, PDAs, smart phones, or other stationary or portable devices) that includes one or more processors and computer readable media. Among other components, the client device 110 includes one or more processors 112, computer readable media 113 that store software applications 114 (e.g., a browser or layout engine), an input module 116 (e.g., a keyboard or mouse), a communication interface 117, and a display device 118. The computing device or devices that implement the search system front-end 140, the query reviser engine 170, and the search engine 150 may include similar or different components.

In general, the search system front-end 140 receives the original query 105 from the client device 110. The search system front-end 140 routes the original query 105 to the appropriate engines included in the search system 130 so that the search system 130 can generate the search results page 155. In some implementations, routing occurs by referencing static routing tables. In other implementations, routing occurs based on the current network load of an engine, in order to accomplish load balancing. In addition, the search system front-end 140 can provide the resulting search results page 155 to the client device 110. In doing so, the search system front-end 140 acts as a gateway, or interface, between the client device 110 and the search engine 150.

Two or more of a search system front-end, a query reviser engine and a search engine (e.g., the search system front-end 140, the query reviser engine 170, and the search engine 150, respectively) may be implemented on the same computing device, or on different computing devices. Because the search system 130 generates the search results page 155 based on the collective activity of the search system front-end 140, the query reviser engine 170, and the search engine 150, the user of the client device 110 may refer to these engines collectively as a "search engine." This specification, however, refers to the search engine 150, and not the collection of engines, as the "search engine," since the search engine 150 identifies the search results 145 in response to the user-submitted query 105.

In some implementations, the search system 130 can include many computing devices for implementing the functionality of the search system 130. The search system 130 can process the received queries and generate the search results by executing software on the computing devices in order to perform the functions of the search system 130.

Referring to FIG. 1, during state (A), a user of the client device 110 enters original query terms 115 for the original query 105, and the client device 110 communicates the original query 105 to the search system 130 over the network 120. For example, the user can submit the original query 105 by initiating a search dialogue on the client device 110, speaking or typing the original query terms 115 of the original query 105, and then pressing a search initiation button or control on the client device 110. The client device 110 formulates the original query 105 (e.g., by specifying search parameters). The client device 110 transmits the original query 105 over the network 120 to the search system 130.

Although this specification refers to the query 105 as an "original" or an "initial" query, such reference is merely intended to distinguish this query from other queries, such as the revised queries that are described below. The designation of the original query 105 as "original" is not intended to require the original query 105 to be the first query that is entered by the user, or to be a query that is manually entered. For example, the original query 105 can be the second or subsequent query entered by the user. In another example, the original query 105 can be automatically derived (e.g., by the query reviser engine 170). In another example, the original query 105 can be modified based on prior queries entered by the user, location information, and the like.

During state (B), the search system front-end 140 receives the original query 105 and communicates the original query 105 to the query reviser engine 170. The query reviser engine 170 can generate one or more revised queries 135 based on the substance of the original query 105. In some implementations, the query reviser engine 170 generates a revised query by incorporating both the substitute terms 125 and the corresponding original query terms 115 with a logical operation (e.g. "OR") in the original query 105. In some other implementations, the query reviser engine 170 generates a revised query by adding terms to the original query 105 using substitute terms 125 for terms in the original query 105. In some other implementations, the query reviser engine 170 generates a revised query by replacing one or more of the original query terms 115 with the substitute terms 125 in the original query 105. The query reviser engine 170 can obtain substitute terms 125 for use in revising the original query 105 from the substitution engine 180.

During state (C), the query reviser engine 170 communicates original query terms 115 of the original query 105 to the substitution engine 180. The substitution engine 180 can use substitution rules included in the substitution rules database 185 to determine one or more substitute terms 125 for one or more of the original query terms 115 of the original query 105.

The substitution engine 180 communicates substitute terms 125 to the query reviser engine 170 during state (D). The query reviser engine 170 can generate one or more revised queries 135 by adding substitute terms 125 to the original query 105. The query reviser engine 170 can also add logical operators (e.g. "OR") between substitute terms 125 and the corresponding original query terms. In addition, the query reviser engine 170 can generate one or more revised queries 135 by substituting certain terms of the original query 105.

In some implementations, the query reviser engine 170 can mark each of the substitute terms 125 with a confidence score in the one or more revised queries 135. The confidence score associated with a substitute term may be stored at the substitution rule database 185 or another database not shown here in the search system 130. In some implementations, the substitution engine 180 may determine the confidence score for a substitute term from previous user interactions with the substitute term in the context of the original query 105. In some other implementations, the substitution engine 180 may determine the confidence score of a substitute term from the search results generated by the original query 105. Alternatively, the administrator of the search system 130 may manually assign the confidence score to a substitute term.

The query reviser engine 170 communicates the one or more revised queries 135 to the search system front-end 140 during state (E). The search system front-end 140 communicates the original query 105 along with the one or more revised queries 135 to the search engine 150 as all queries 137 during state (F). The search engine 150 generates search results 145 that it identifies as being responsive to the original query 105 and/or the one or more revised queries 135. The search engine 150 can identify search results 145 for each query using an index database 160 that stores indexed resources (e.g., web pages, images, or news articles on the Internet). In some implementations, the search results 145 may include other types of features that are associated with the user's query 105. For example, the search engine 150 may identify and include a map or an advertisement in the search results 145. The search engine 150 can combine and rank the identified search results 145 and communicate the search results 145 to the search system front-end 140 during state (G). In some implementations, the confidence scores associated with the substitute terms 125 in the one or more revised queries 135 may affect the ranking of the identified search results 145. For example, if the confidence score for a substitute term is below a threshold, a search result identified by the substitute term may be ranked lower than another search result identified by an original query term.

The search system front-end 140 generates a search results page 155 that identifies the search results 145. For example, each of the search results 145 can include, but are not limited to, titles, text snippets, images, links, reviews, or other information. The original query terms 115 or the substitute terms 125 that appear in the search results 145 can be formatted in a particular way (e.g., in bold print and/or italicized print). For example, the search system front-end 140 transmits a document that includes markup language (e.g., HyperText Markup Language or eXtensible Markup Language) for the search results page 155 to the client device 110 over the network 120 at state (H). The client device 110 reads the document (e.g., using a web browser) in order to display the search results page 155 on display device 118. The client device 110 can display the original query terms 115 of the original query 105 in a query box (or "search box"), located, for example, on the top of the search results page 155. In addition, the client device 110 can display the search results 145 in a search results box, for example, located on the left-hand side of the search results page 155.

The search system front-end 140 generates a search results page 155 that identifies the search results 145. For example, each of the search results 145 can include, but are not limited to, titles, text snippets, images, links, reviews, maps, advertisements, or other information. The original query terms 115 or the substitute terms 125 that appear in the search results 145 can be formatted in a particular way (e.g., in bold print and/or italicized print). For example, the search system front-end 140 transmits a document that includes markup language (e.g., HyperText Markup Language or eXtensible Markup Language) for the search results page 155 to the client device 110 over the network 120 at state (H). The client device 110 reads the document (e.g., using a web browser) in order to display the search results page 155 on display device 118. The client device 110 can display the original query terms 115 of the original query 105 in a query box (or "search box"), located, for example, on the top of the search results page 155. In addition, the client device 110 can display the search results 145 in a search results box, for example, located on the left-hand side of the search results page 155.

FIG. 2 is a block diagram of an example system 200 that identifies substitute terms based on the existence of over-represented terms in search results. Briefly, when a user makes a request to obtain search results using particular query terms, the system 200 generates an initial set of search results, and identifies over-represented terms from the initial set of search results. The system 200 then determines whether one or more of the identified over-represented terms are substitute terms of one or more of the original query terms. If one or more over-represented terms are determined as substitute terms of the original query terms, the system 200 revises the original query to include the identified over-represented terms, and generates a subsequent set of search results based on revised query.

In general, the system 200 includes a client device 201, a network 202, a search system front-end 204, a query reviser engine 205, a substitution engine 206, a search engine 208, and a collection 210 of substitution rules. The search system front-end 204 coordinates the requests and responses among the client device 201, the query reviser engine 205, the substitution engine 206, and the search engine 208. For example, when a user operating the client device 201 issues an original query, the original query can be routed to the search system front end 204 through the network 202. The search system front-end 204 can then forward the original query to another engine in the search system.

The query reviser engine 205 receives an original query from another engine in the search system as an input, and based on the substance of the original query, the query reviser engine 205 can generate a revised query by adding, substituting, or removing query terms in the original query. For example, the query reviser engine 205 can generate a revised query to include substitute terms of the original query terms. In some implementations, the query reviser engine 205 may add logical operators (e.g. "OR") between a substitute term and an original query term in the revised query. In some implementations, the query reviser engine 205 may generate a revised query based on indications from the substitution engine 206.

The substitution engine 206 applies one or more substitution rules from a collection 210 of substitution rules to an input query term, and provides the query reviser engine 205 with a substitute term to the input query term. The collection 210 of substitution rules is, for example, a list or other data structure that specifies which substitute terms or substitution rules that a query reviser may use to revise search queries. The data structure may be constructed in any type of formal (e.g., text, binary, etc.), as long as the collection 210 can modify the data structure within the collection 210.

A substitution rule in the collection 210 is a rule which has been selected for use by a query reviser engine 205 in revising search queries. The selection can be determined by an evaluation or test under certain criteria. In some implementations, the substitution engine 206 can perform the evaluation. In some implementations, the substitution rule can either be in the general context, in which the substitution rule applies regardless of other terms in the query, or the substitution rule can be context-specific, in which the substitution rule only applies when other particular words are in the query. For example, a substitution rule "(Y→Z)" indicates that the query reviser engine 205 may revise search queries that include the query term "Z" to include the substitute term "Y."

In some implementations, the substitution engine 206 may evaluate a query term and a corresponding substitute term candidate in a substitution rule and associate the substitution rule as either a strong or a weak substitution rule. In some implementations, the strong/weak association with a substitution rule may be encoded as another data structure different from the data structure of a substitution rule. For example, the substitution engine 206 can perform a confidence score evaluation by comparing the returned search results between a particular query term and a substitute term candidate. The substitution engine 206 may associate a substitution rule as a strong substitution rule if the confidence score is above a threshold, or associate the substitution rule as a weak substitution rule if the confidence score is below the threshold.

The confidence score can be based on a combination of criteria, where each criterion can have a different weight. In some implementations, the substitution engine 206 may determine the confidence score for a substitute term from previous user interactions with the substitute term in the context of the original query. In some other implementations, the substitution engine 206 may determine the confidence score of a substitute term from the search results generated by the original query. Alternatively, the administrator of the substitution engine 206 may manually assign the confidence score to a substitute term.

In some implementation, one criterion of the confidence score evaluation may be context-specific. For example, the substitution engine 206 may identify the term "arthritis" as a substitute term to the query term "foot," where this may be a strong substitution rule in the context of a medical condition, but may be a weak substitution rule in the general context.

In some implementations, a criterion may be geography-specific. For example, the substitution engine 206 may identify the name of a popular chef in Seattle as a substitute term to the query term "restaurant." This substitution rule may be a strong substitution rule for users in Seattle or for queries related to both "restaurant" and "Seattle," but may be a weak substitution rule everywhere else.

In some implementations, one criterion may be time-specific. For example, the substitution engine 206 may identify the term "constitutional" as a substitute term to the query term "healthcare" during a period of time when there is extensive news coverage on the particular topic of whether universal healthcare is a violation of a person's constitutional right. Initially this substitution rule may be a strong substitution rule, but as time progresses and the news coverage decreases in volume, the substitution engine 206 may determine this substitution rule as a weak substitution rule.

In some implementations, the substitution engine 206 may apply a strong substitution rule to identify a substitute term because the substitution engine 206 has previously determined that the strong substitution rule may in general improve search quality. In some implementations, the substitution engine 206 may not in general apply a weak substitution rule to identify a substitute term because the substitution engine 206 has previously determined that the weak substitution rule may not necessarily improve search quality despite that the terms in the weak substitution rule are related in some aspect. However, in some implementations, if the substitution engine 206 has identified a substitute term candidate as an over-represented term in the search results, the substitution engine 206 may apply the weak substitution rule to identify the over-represented term as a substitute term because the over-represented term has empirically demonstrated some enhanced significance in the search results. In some other implementations, if the substitution engine 206 has identified a substitute term candidate as an over-represented term in the search results, the substitution engine 206 may increase the confidence score of the weak substitution rule because the over-represented term has empirically demonstrated some enhanced significance in the search results.

In some implementations, the substitution engine 206 may determine that a term is over-represented if the term's overall rate of occurrence among the search results is higher, or significantly higher, than the term's rate of occurrence in the corpus as a whole. In some other implementations, the substitution engine 206 may determine a term as over-represented if the search results include more than one document where the term's occurrence rate is significantly higher than the rate the term occurs in the corpus as a whole. In some other implementations, the substitution engine 206 may determine a term as over-represented if the term's frequency-inverse document frequency (tf-idf) weight is above a threshold.

In general, there may be directionality between an original term and a substitute term in a substitution rule. For example, a substitution rule "Feline→Cat" indicates that "Feline" may be a substitute term for "Cat," but "Cat" may not be a substitute term for "Feline." However, in some implementations, because the over-represented term may be a rare term, the substitution engine 206 may identify the over-represented term as a substitute term for an original query term if the over-represented term exists on either side of a substitution rule. For example, if the substitution engine 206 determines the term "Feline" as an over-represented term, the substitution engine 206 may identify "Feline" as a substitute term for "Cat" if either the substitution rule "Feline→Cat" or the substitution rule "Cat→Feline" exists in the collection 210 of substitution rules.

The search engine 208 can generate search results based on the collective activity of the search system front-end 204, the query reviser engine 205, and the substitution engine 206. The search engine 208 can generate search results from one or more corpuses of resources. A corpus of resources (e.g., a search corpus) is a collection of resources that typically contains many (e.g., thousands or millions) resources or references to resources. In some implementations, resources can be added to a corpus over time. The resources can be in the form of word documents, images, videos, webpages, maps, advertisements, etc. Each search result may include information including a title, a website address, a snippet of the resource, and a resource referred by the search result. In some implementations, the substitution engine 206 may evaluate a set of search results generated by the search engine 208 to identify over-represented terms.

FIG. 2 also illustrates an example flow of data, shown in states (A) to (K). States (A) to (K) may occur in the illustrated sequence, or they may occur in a sequence that is different than in the illustrated sequence. In some implementations, the search system may perform computations related to one or more of the states (A) to (K) offline, where a user is not connected to the search system. During state (A), a user operating a client device 201 makes an original query 211 "Foot Pain" to the search system. Here, the user may have experienced pain in the foot, but does not know the appropriate medical terms associated with the symptoms. The original query 211 is transmitted to the network 202, where the network 202 then routes the original query 211 to the search system front-end 204.

During state (B), the search system front-end 204 receives the original query 211, and forwards the original query 211 to the query reviser engine 205 and the search engine 208. In some implementations, the query reviser engine 205 may store the original query 211 until the substitution engine 206 sends an indication to revise the original query 211. In some implementations, the query reviser engine 205 may forward the original query 211 to the substitution engine 206 for substitute term identification.

During state (C), the search engine 208 generates an initial set 212 of search results based on the original query 211. In some implementations, each search result in the initial set 212 may include information including a title, a website address, a snippet of the resource, and the resource referred by the search result. In some implementations, the search engine may determine a search score for each of the search results, where the search score is associated with the resource referenced by the corresponding search result. The search scores may or may not be dependent on the query received at the search engine. In some implementations, the initial set 212 of search results are then ranked according to their relative search scores.

The search engine 208 then forwards the ranked initial set 212 of search results to the substitution engine 206. In some implementations, the search engine 208 may forward the entirety of initial set 212 of search results to the substitution engine 206. In some other implementations, the search engine 208 may forward to the substitution engine 206 a pointer to a remote location where the initial set 212 of search results can be retrieved. In some implementations, the search engine 208 may forward the original query 211 to the substitution engine 206 along with the initial set 212 of search results.

During state (D), the substitution engine 206 evaluates the initial set 212 of search results and identifies over-represented terms in the initial set 212 of search results. In some implementations, the substitution engine 206 may evaluate the initial set 212 of search results in real time. In some other implementations, the substitution engine 206 may have performed the evaluation of the initial set 212 of search results offline, based on one or more previous searches with similar or identical queries. In some implementations, the substitution engine 206 may evaluate a subset of the initial set 212 to identify the over-represented terms. In some implementations, the substitution engine 206 may identify the over-represented terms in the resources referred by the search results. In some other implementations, the substitution engine 206 may identify the over-represented terms in the snippets of the search results. In some other implementation, the substitution engine 206 may identify the over-represented terms in the titles of the search results.

In this present example, the substitution engine 206 identifies over-represented terms by parsing through the texts of the resources referred by the initial set 212 of search results, including search results 241, 242, 243, and 244, and searching for particular texts where the instances of appearances of the texts exceed a predefined threshold. Here, the substitution engine 206 has identified two over-represented terms, "arthritis" 261 in the search result 242 and "memory" 262 in the search result 243. Both search results 242 and 243 contain the original query terms "foot" and "pain," but the two search results 242 and 243 refer to resources describing different subjects. The search result 242 is related to an overview of the medical condition arthritis, whereas the search result 243 is related to a user's blog on her memory with her cat.

During state (E), the substitution engine 206 identifies substitute terms to the original query terms. In some implementations, the identification may include two parts, where the sequence of the identification may occur in any order. First, the substitution engine 206 may determine substitute terms to the original query terms by applying the strong substitution rules stored in the collection 210 of substitution rules. Second, the substitution engine 206 may evaluate the identified over-represented terms 261 and 262 and determine whether they are substitute terms to one or more query terms of the original query 211. In some implementations, the substitution engine 206 determines whether over-represented terms 261 and 262 are substitute terms to the original query terms by applying both the strong and weak substitution rules stored in the collection 210 of substitution rules. In the present example, the substitution engine 206 determines whether the over-represented terms 261 and 262 are substitutions of one or more of the original query terms by determining (i) is "Arthritis" a substitute term of "Foot"? (ii) is "Arthritis" a substitute term of "Pain"? (iii) is "Memory" a substitute term of "Foot"?, and (iv) is "Memory" a substitute term of "Pain"?

During state (F), the substitution engine 206 identifies the substitution rules associated with each of the original query terms in the collection 210 of substitution rules. In some implementations, the identification may include two parts, where the sequence of the identification may occur in any order. First, the substitution engine 206 may identify the strong substitution rules associated with each of the original query terms. In this present example, a strong substitution rule 232 is identified in the collection 210 of substitution rules indicating that the term "Suffer" is a substitute term to one of the original query terms "Pain." Second, the substitution engine 206 may identify both the strong and the weak substitution rules which associate the over-represented terms with one or more of the original query terms. In this present example, a weak substitution rule 231 is identified in the collection 210 of substitution rules indicating that the over-represented term 261 "Arthritis" is a substitute term to one of the original query terms "Foot" Here, another weak substitution rule 233 associating the term "Table" as a substitute term to one of the original query term "Foot" is stored in the collection 210 of substitution rules, but the substitution engine 206 does not select the substitution rule 233 because the term "Table" is not identified as an over-represented term in the initial set 212 of search results. The substitution engine 206 also determines that "Arthritis" is not a substitute term of "Pain," "Memory" is not a substitution of "Foot," and "Memory" is not a substitute term of "Pain" because there are no corresponding substitution rules for these original term/over-represented term pairs stored in the collection 210 of substitution rules.

During state (C), the substitution engine 206 sends the two identified substitution rules "Arthritis→Foot" 231 and "Suffer→Pain" 232 in a message 214 to the query reviser engine 205. In some implementations, the substitution engine 206 may send the original query 211 along with the substitution rules 231 and 232 in the message 214 to the query reviser engine 205. In some implementations, the substitution engine 206 may not specify whether an identified substitution rule is weak or strong in the message 214. In some other implementations, the substitution engine 206 may specify whether an identified substitution rule is weak or strong in the message 214, and the query reviser engine 205 can then revise the original query accordingly. For example, the query reviser engine 205 may substitute an original query term with a corresponding substitute term if the substitution rule is strong, but may add a substitute term to the original query while keeping the corresponding original query term in the original query if the substitution rule is weak.

During state (H), the query reviser engine 205 generates a revised query 215 using substitute terms identified by the substitution engine 206, and forwards the revised query 215 to the search engine 208. In this present example, the query reviser engine 205 sends the revised query 215 ["Foot OR Arthritis", "Pain OR Suffer"] to the search engine 208, which includes both the strong and weak substitute terms associated with the original query 211 "Foot Pain."

During state (J), the search engine 208 generates a revised set 216 of search results from the revised query 215, and forwards the ranked revised set 216 of search results to the search system front-end 204. In some implementations, the revised set 216 of search results may come from the same corpus of indexed resources as the initial set 212 of search results. In some other implementations, the revised set 216 of search results may come from a different corpus of indexed resources as the initial set 212 of search results. For example, a different corpus of indexed resources may be a corpus of an older or later version, or may be a corpus of a different resource type (e.g. maps instead of documents). Here, the initial set 212 of search results may come from a general-context corpus of index resources, whereas the revised set 216 of search results may come from a medical-context corpus of index resources. In some implementations, the search engine 208 may forward the entirety of ranked revised set 216 of search results to the search system front-end 204. In some other implementations, the search engine 208 may forward to the search system front-end 204 a pointer to a remote location where the revised set 216 of search results can be retrieved.

During state (K), the search system front-end 204 forwards a ranked final set 218 of search results to the client device 201. In some implementations, the ranked final set 218 of search results may be a subset of the revised set 216 of search results. The search system front-end 204 may determine the number of search results to be included in the final set 218 based on the type of the client device 201. For example, if the client device 201 is a smart phone or a device with limited amounts of memory or processing power or limited displaying area, the search system front-end 204 may forward the top n search results in the revised set 216 to the client device 201, where n is a predetermined number.

In this present example, the client device 201 receives the final set 218 of search results from the search system front-end 204, which includes ranked search results 251, 252, 242, and 241. The final set 218 of search results may be distinguishable from the initial set 212 of search results in several aspects. First, the final set 218 of search results may include search results which are not in the initial set 212. For example, the initial set 212 of search results do not include the search results 251 and 252. Second, the final set 218 of search results may not include some of the search results which are in the initial set 212. For example, the final set 218 of search results do not include the search results 243 and 244, as included in the initial set 212 of search results. Third, the relative rankings of the search results which are included in both the initial set 212 and final set 218 of search results may be different. For example, in the initial set 212 of search results, the search result 241 is ranked higher than the search result 242. However, in the final set 218 of search results, the search result 241 is ranked lower than the search result 242. The revised query 215 may change the relative ranking of the search results, as determined by the search engine 208.

Figure 3:
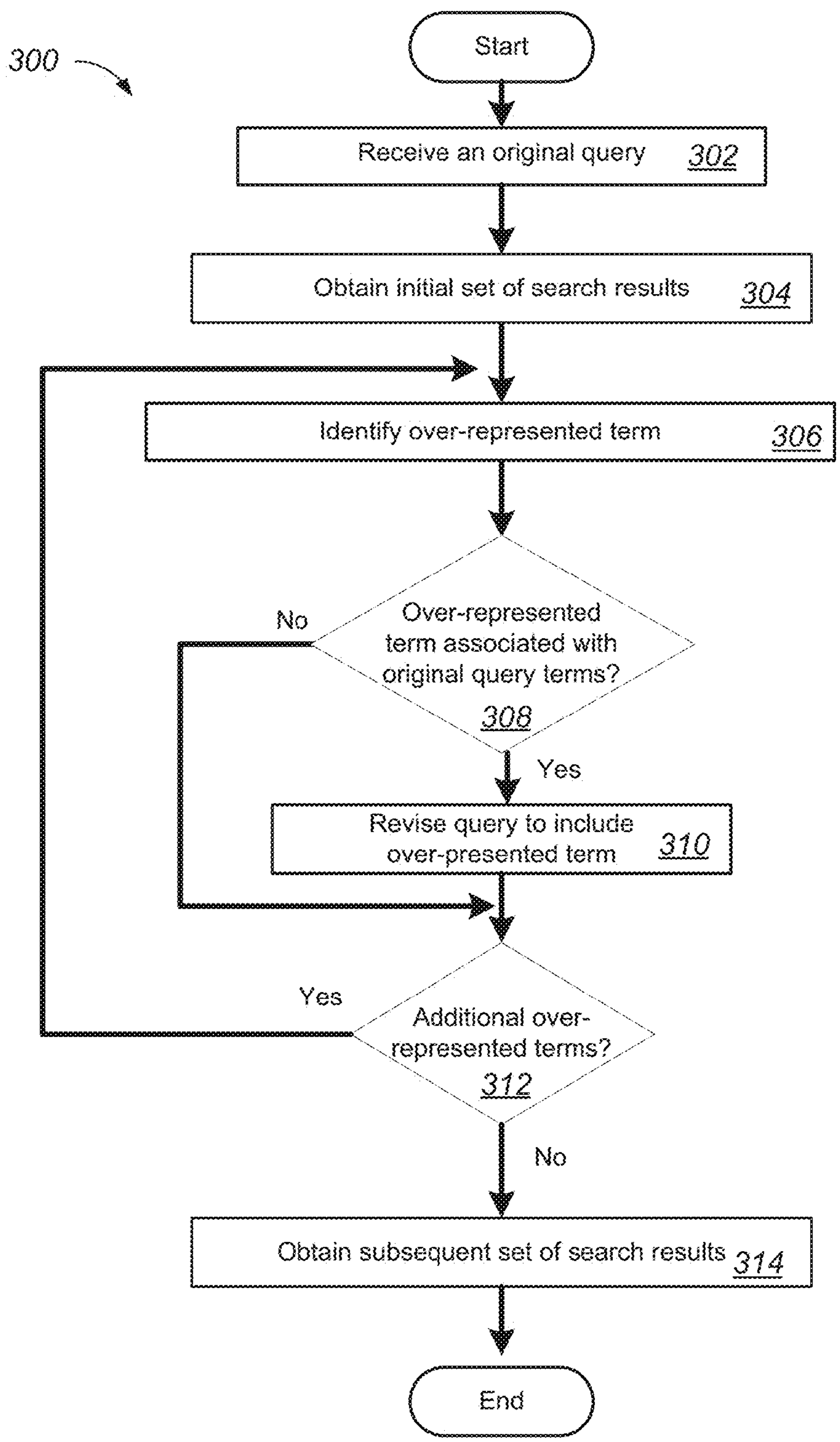
FIG. 3 is a flow chart illustrating an example process for obtaining revised search results based on identification of over-represented terms as substitute terms to the original query terms.

FIG. 3 is a flow chart illustrating an example process 300 for obtaining revised search results based on identification of over-represented terms as substitute terms to the original query terms. In general, the process 300 analyzes an initial set of search results, and obtains a subsequent set of search results based on substitute terms identified by over-represented terms from the initial set. The process 300 will be described as being performed by a computer system comprising one or more computers, for example, the substitution engine 206 as shown in FIG. 2.

The system receives an original query that includes at least one query term (302). In general, a user operating a client device may make the original query to the system, and the user may not know the exact query terms to obtain the most relevant results. The system then obtains an initial set of search results (304). In some implementations, each search result in the initial set may include information including a title, a website address, a snippet of the resource, and the resource referred by the search result. In some implementations, the system determines a search score for each of the search results, where the search score is associated with the resource referenced by the corresponding search result. The search scores may or may not be dependent on the query received at the system. In some implementations, the system ranks the initial set of search results according to their relative search scores.

The system then identifies an over-represented term in text associated with a subset of the initial search results (306). In some implementations, the system may determine a term as over-represented if the term's overall rate of occurrence among the search results is significantly higher than the rate the term occurs in the corpus as a whole. In some other implementations, the system may determine a term as over-represented if the search results include more than one document where the term's occurrence rate is significantly higher than the rate the term occurs in the corpus as a whole. In some other implementations, the system may determine a term as over-represented if the term's frequency-inverse document frequency (tf-idf) weight, which is a well-recognized method for scoring the importance of a term, is above a threshold.

Upon identifying the over-represented term, the system determines whether the over-represented term is associated with one or more of the original query terms (308). In some implementations, the system may associate the over-represented term with an original query term by applying substitution rules stored at the system and determining whether an over-represented term is a substitute term to the original query term.

In some implementations, the system may also associate the substitution rule either as a strong or a weak substitution rule. For example, the system may perform a confidence score evaluation by comparing the returned search results between a particular query term and a substitute term candidate. The system may associate a substitution rule as a strong substitution rule if the confidence score is above a threshold, or associate the substitution rule as a weak substitution rule if the confidence score is below the threshold. The confidence score can be based on a combination of criteria, where each criterion can have a different weight. In some implementations, a criterion may be geography-specific. In some implementations, a criterion may be time-specific. In some implementations, a criterion may be context-specific. In some implementations, the system may determine the confidence score for a substitute term from previous user interactions with the substitute term in the context of the original query. In some other implementations, the system may determine the confidence score of a substitute term from the search results generated by the original query. Alternatively, the administrator of the system may manually assign the confidence score to a substitute term. In some implementations, the strong/weak association with a substitution rule may be encoded as another data structure different from the data structure of a substitution rule.

In some implementations, the system may apply a strong substitution rule to generate a substitute term for an original query term, but the system may not apply a weak substitution rule to generate a substitute term for the original query term. In some in the system may apply a weak substitution rule to generate a substitute term for the original query term if the system identifies the corresponding substitute term candidate is an over-represented term. In general, a substitution rule may have directionality. However, in some implementations, because the over-represented term may be a rare term, the system may identify the over-represented term as a substitute term for an original query term if the over-represented term exists on either side of a substitution rule.

In the case where the system has determined the over-represented term is associated with at least one of the original query terms, e.g., through a strong or weak substitution rule, the system revises the original query to include the over-represented term (310). In some implementations, the system can generate a revised query by adding the over-represented term to the original query. In some other implementations, the system can generate a revised query by replacing the original query term with the over-represented term. In some implementations, the system may add logical operators (e.g. "OR") between a substitute term and an original query term in the revised query.

The system continues to identify over-represented terms until the system has identified all the over-represented terms and their associations with the original query terms in the subset of the initial set of search results (312). The system then uses the revised query to obtain a subsequent set of search results (314). In some implementations, the subsequent set of search results may come from the same corpus of indexed resources as the initial set of search results. In some other implementations, the subsequent set of search results may come from a different corpus of indexed resources as the initial set of search results. For example, a different corpus of indexed resources may be a corpus of an older or later version, or may be a corpus of a different resource type. The subsequent set of search results may be distinguishable from the initial set of search results in several aspects. First, the subsequent set of search results may include search results which are not in the initial set. Second, the subsequent set of search results may not include some of the search results which are in the initial set. Third, the relative rankings of the search results which are included in both the initial set and subsequent set of search results may be different. The revised query may change the relative ranking of the search results, as determined by the system.

FIG. 4 shows an example table 400 of how to determine whether to include an identified term in a revised query. The identification of a term and the revision of the query described in the table 400 can be performed by a computer system comprising one or more computers, for example, the substitution engine 206 as shown in FIG. 2. In some implementations, the system may identify a term in the search results.

In some implementations, an over-represented term may be a term where the instances of appearances of the term in a search result are more than a predefined threshold. The threshold may be defined manually by an administrator of the system, or automatically by the system upon receiving the original query and obtaining the search results. In some implementations, the system may determine a term as over-represented if the term's overall rate of occurrence among the search results is significantly higher than the rate the term occurs in the corpus as a whole. In some other implementations, the system may determine a term as over-represented if the search results include more than one document where the term's occurrence rate is significantly higher than the rate the term occurs in the corpus as a whole. In some other implementations, the system may determine a term as over-represented if the term's frequency-inverse document frequency (tf-idf) weight, which is a well-recognized method for scoring the importance of a term, is above a threshold.

In some implementations, the system can generate a revised query by adding the over-represented term to the original query. In some other implementations, the system can generate a revised query by replacing the original query term with the over-represented term. In some implementations, the system may add logical operators (e.g. "OR") between a substitute term and an original query term in the revised query.

In the case where the identified term is a stop word, the system may not revise the original query to include identified term (411). In some implementations, stop words can be a list of words defined manually by the system administrator. Stop words can be the most common and short functional words in the dictionary. Examples of stop words include "a", "the", "on", etc.

In the case where the identified term is not an over-represented term, the system determines whether there is a strong or weak substitution rule associated with the identified term. In the case where the identified term is not associated either with a strong or a weak substitution rule, the system may not revise the original query to include the identified term (412). In the case where the identified term is associated with a strong substitution rule, the system may revise the original query to include the identified term because the system has previously determined that the identified term in general may improve the search quality as suggested by the strong substitution rule (413). In the case where the identified term is associated with a weak substitution rule, the system may not revise the original query to include the identified term because the system has previously determined that the identified term in general may not improve the search quality as suggested by the weak substitution rule association (414).

In the case where the identified term is an over-represented term, the system determines whether there is a strong or weak substitution rule associated with the identified term. If the identified over-represented term is not associated either with a strong or a weak substitution rule; the system may not revise the original query to include the over-represented term (415). In the case where the identified over-represented term is associated with a strong substitution rule; the system may revise the original query to include the over-represented term because the system has previously determined that the over-represented term in general may improve the search quality as suggested by the strong substitution rule association (416). In the case where the identified over-represented term is associated with a weak substitution rule, the system may revise the original query to include the over-represented term because the system has determined that the over-represented term has empirically demonstrated some significance in the search results, and therefore may help further improve search quality if the over-represented term is included in the revised query (417).

Various implementations of the systems and techniques described here may be realized in digital electronic circuitry; integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor; which may be special or general purpose, coupled to receive data and instructions from; and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:

receiving an original query that includes one or more query terms;

determining, by one or more computers, not to apply a weak query term substitution rule to the original query, wherein the weak query term substitution rule identifies a particular term as a substitute for one or more of the query terms;

after determining not to apply the weak query term substitution rule to the original query, obtaining an initial set of search results from a text corpus of indexed resources;

determining, using the particular term's frequency-inverse document frequency (tf-idf) weight and by one or more computers, that the particular term occurs in text associated with a subset of the initial set of search results at a higher rate than the particular term occurs in the text corpus as a whole;

in response to determining that the particular term occurs in text associated with the subset of the initial set of search results at the higher rate than the particular term occurs in the text corpus as a whole, applying the weak query term substitution rule to the original query, to revise the original query to include the particular term; and obtaining a subsequent set of search results in response to the revised query.

2. The method of claim 1, further comprising:

providing a subset of the subsequent set of search results.

3. The method of claim 1, wherein the initial set of search results are obtained from an initial text corpus of indexed resources and the subsequent set of search results are obtained from a different corpus of indexed resources.

4. The method of claim 3, wherein types of the different corpus of indexed resources comprise one or more of text, image, video, advertisement, and map.

5. The method of claim 1, wherein determining that the particular term occurs in text at the higher rate further comprises determining that the particular term occurs in text from one or more of titles, snippets, and resources associated with the subset of the initial set of search results.

6. The method of claim 1, wherein the weak query term substitution rule is associated with a low confidence score.

7. The method of claim 6, wherein the particular term is input of the weak query term substitution rule.

8. The method of claim 1, further comprising:

modifying a confidence score of the particular term associated with the one or more of the query terms.

9. The method of claim 1, wherein revising the original query to include the particular term further comprises adding the particular term and one or more logical operators to the original query.

10. The method of claim 1, wherein revising the original query to include the particular term further comprises replacing the one or more of the query terms with the particular term.

11. The method of claim 1, wherein determining that the particular term occurs in text further comprises determining that the particular term's overall rate of occurrence in a document referenced by the initial set of search results is higher than the particular term's rate of occurrence in the text corpus as a whole.

12. The method of claim 1, wherein determining that the particular term occurs in text associated with a subset of the initial set of search results at the higher rate further comprises determining that the particular term's frequency-inverse document frequency (tf-idf) weight is above a threshold.

13. A non-transitory computer-readable medium storing software having stored thereon instructions, which, when executed by one or more computers, cause the one or more computers to perform operations of:

receiving an original query that includes one or more query terms;

determining not to apply a weak query term substitution rule to the original query, wherein the weak query term substitution rule identifies a particular term as a substitute for one or more of the query terms;

after determining not to apply the weak query term substitution rule to the original query, obtaining an initial set of search results from a text corpus of indexed resources;

determining, using the particular term's frequency-inverse document frequency (tf-idf) weight, that the particular term occurs in text associated with a subset of the initial set of search results at a higher rate than the particular term occurs in the text corpus as a whole;

in response to determining that the particular term occurs in text associated with the subset of the initial set of search results at the higher rate than the particular term occurs in the text corpus as a whole, applying the weak query term substitution rule to the original query, to revise the original query to include the particular term; and obtaining a subsequent set of search results in response to the revised query.

14. The computer-readable medium of claim 13, wherein the operations comprise:

providing a subset of the subsequent set of search results.

15. The computer-readable medium of claim 13, wherein the initial set of search results are obtained from an initial text corpus of indexed resources and the subsequent set of search results are obtained from a different corpus of indexed resources.

16. The computer-readable medium of claim 15, wherein types of the different corpus of indexed resources comprise one or more of text, image, video, advertisement, and map.

17. The computer-readable medium of claim 13, wherein determining that the particular term occurs in text at the higher rate further comprises determining that the particular term occurs in text from one or more of titles, snippets, and resources associated with the subset of the initial set of search results.

18. The computer-readable medium of claim 13, wherein the weak query term substitution rule is associated with a low confidence score.

19. The computer-readable medium of claim 18, wherein the particular term is input of the weak query term substitution rule.

20. The computer-readable medium of claim 13, wherein the operations comprise:

modifying a confidence score of the particular term associated with the one or more of the query terms.

21. The computer-readable medium of claim 13, wherein revising the original query to include the particular term further comprises adding the particular term and one or more logical operators to the original query.

22. The computer-readable medium of claim 13, wherein revising the original query to include the particular term further comprises replacing the one or more of the query terms with the particular term.

23. The computer-readable medium of claim 13, wherein determining that the particular term occurs in text further comprises determining that the particular term's overall rate of occurrence in a document referenced by the initial set of search results is higher than the particular term's rate of occurrence in the text corpus as a whole.

24. The computer-readable medium of claim 13, wherein determining that the particular term occurs in text associated with a subset of the initial set of search results at the higher rate further comprises determining that the particular term's frequency-inverse document frequency (tf-idf) weight is above a threshold.

25. A system comprising:

one or more computers and one or more storage devices storing instructions that are operable, when executed by the one or computers, to cause the one or more computers to perform operations comprising:

receiving an original query that includes one or more query terms;

determining not to apply a weak query term substitution rule to the original query, wherein the weak query term substitution rule identifies a particular term as a substitute for one or more of the query terms;

after determining not to apply the weak query term substitution rule to the original query, obtaining an initial set of search results from a text corpus of indexed resources;

determining, using the particular term's frequency-inverse document frequency (tf-idf) weight, that the particular term occurs in text associated with a subset of the initial set of search results at a higher rate than the particular term occurs in the text corpus as a whole;

in response to determining that the particular term occurs in text associated with the subset of the initial set of search results at the higher rate than the particular term occurs in the text corpus as a whole, applying the weak query term substitution rule to the original query, to revise the original query to include the particular term; and obtaining a subsequent set of search results in response to the revised query.

26. The system of claim 25, wherein the operations comprise:

providing a subset of the subsequent set of search results.

27. The system of claim 25, wherein the initial set of search results are obtained from an initial text corpus of indexed resources and the subsequent set of search results are obtained from a different corpus of indexed resources.

28. The system of claim 27, wherein types of the different corpus of indexed resources comprise one or more of text, image, video, advertisement, and map.

29. The system of claim 25, wherein determining that the particular term occurs in text at the higher rate further comprises determining that the particular term occurs in text from one or more of titles, snippets, and resources associated with the subset of the initial set of search results.

30. The system of claim 25, wherein the weak query term substitution rule is associated with a low confidence score.

31. The system of claim 30, wherein the particular term is input of the weak query term substitution rule.

32. The system of claim 25, wherein the operations further comprise:

modifying a confidence score of the particular term associated with the one or more of the query terms.

33. The system of claim 25, wherein revising the original query to include the particular term further comprises adding the particular term and one or more logical operators to the original query.

34. The system of claim 25, wherein revising the original query to include the particular term further comprises replacing the one or more of the query terms with the particular term.

35. The system of claim 25, wherein determining that the particular term occurs in text further comprises determining that the particular term's overall rate of occurrence in a document referenced by the initial set of search results is higher than the particular term's rate of occurrence in the text corpus as a whole.

36. The system of claim 25, wherein determining that the particular term occurs in text associated with a subset of the initial set of search results at the higher rate further comprises determining that the particular term's frequency-inverse document frequency (tf-idf) weight is above a threshold.

* * * * *